United States Patent [19]

Ishida

[11] Patent Number: 5,023,412
[45] Date of Patent: Jun. 11, 1991

[54] HORN SWITCH ON STEERING WHEEL

[75] Inventor: Syuichi Ishida, Aichi, Japan

[73] Assignee: Toyoda Gosei Co., Ltd., Nishikasugai, Japan

[21] Appl. No.: 494,304

[22] Filed: Mar. 16, 1990

[30] Foreign Application Priority Data

Apr. 24, 1989 [JP] Japan ............................... 1-48151[U]

[51] Int. Cl.$^5$ ...................... H01H 9/00; H01H 13/08; B62D 1/04
[52] U.S. Cl. ............................... 200/61.54; 200/61.57
[58] Field of Search ........................... 200/61.54–61.57

[56] References Cited

U.S. PATENT DOCUMENTS

| | | | |
|---|---|---|---|
| 4,447,684 | 5/1984 | Sugiyama | 200/61.54 |
| 4,590,340 | 5/1986 | Koike et al. | 200/61.54 |
| 4,594,486 | 6/1986 | Noda | 200/61.54 |
| 4,789,763 | 12/1988 | Nagata et al. | 200/61.54 |

FOREIGN PATENT DOCUMENTS 58-42112  3/1983  Japan .
61-14433  1/1986  Japan .

Primary Examiner—J. R. Scott
Attorney, Agent, or Firm—Cushman, Darby & Cushman

[57] ABSTRACT

A steering wheel mountable horn switch is provided which can be operated by either a substantially downward depression of a horn button or by a tilting of the horn button. The switch includes a stationary contact plate, a movable contact plate which is disposed above the staitonary contact plate and is urged away from the stationary contact plate, a device for electrically insulating the movable contact plate from accidental electrical contact with an upper side of the stationary contact plate and a horn button which is disposed vertically above the movable contact plate. The horn button includes a stem mounted to an underside thereof which extends through through-holes defined in each of the contact plates. Finally, a plate-shaped member is fixedly mounted at one end thereof to the horn button stem.

8 Claims, 4 Drawing Sheets

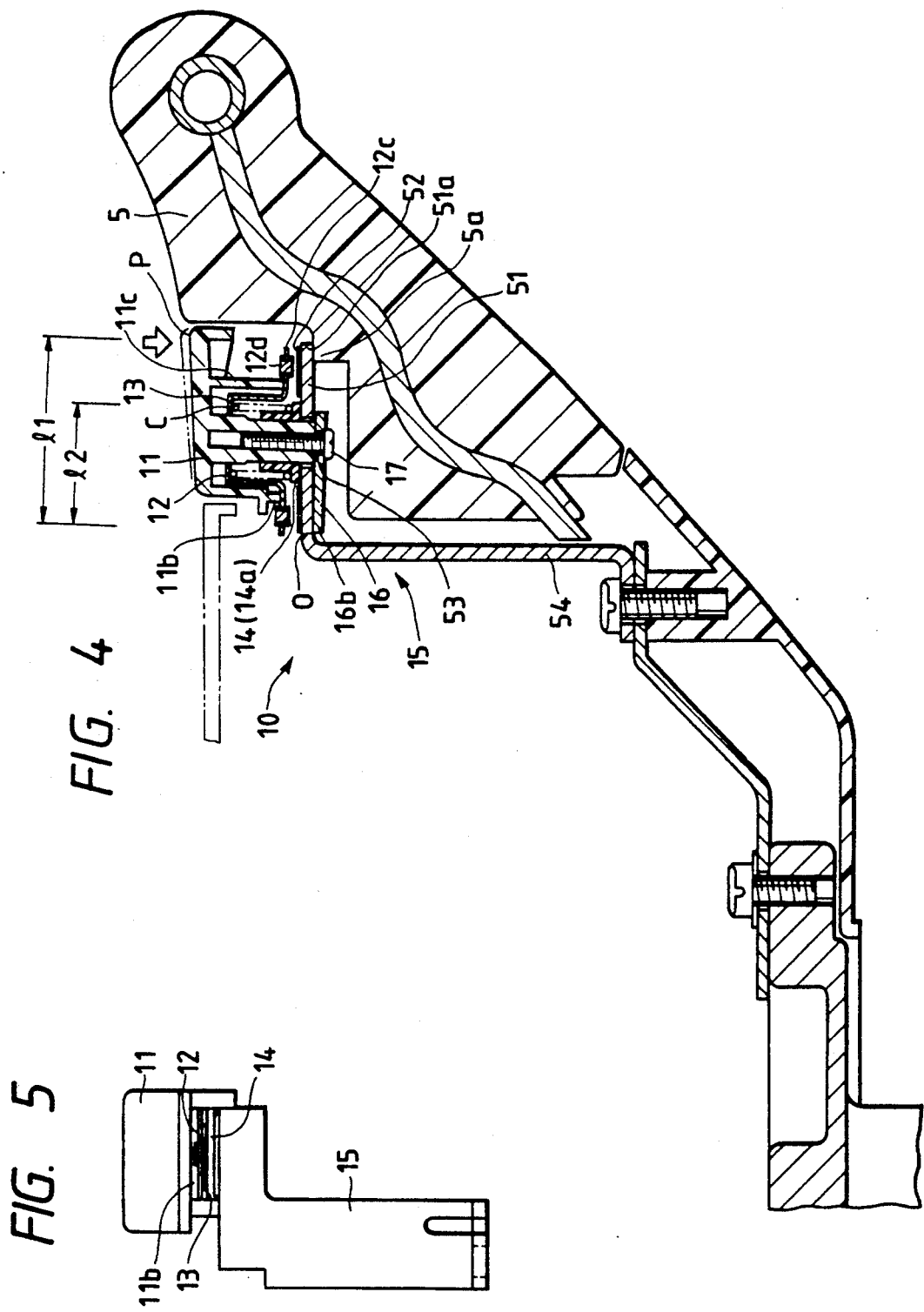

HORN SWITCH ON STEERING WHEEL

BACKGROUND OF THE INVENTION

1. FIELD OF THE INVENTION

This invention relates to a horn switch installed on a steering wheel, and more particularly to a button type horn switch provided on a part, such as a spoke, of a steering wheel.

2. DESCRIPTION OF THE RELATED ART

A horn switch of this type has been disclosed by Japanese Utility Model Application Publication (OPI) No. 14433/1986 (the term "OPI" as used herein means an "unexamined published application"). In the horn switch disclosed therein, an operating button hereinafter referred to as a "horn button" when applicable is provided which is located so as to be immediately above a coil spring in such a manner that it is capable of moving resiliently in the up and down directions, such up and down movement encompassing the operation of the horn.

In order to operate the horn disclosed therein, the horn button must be depressed against the resilient force of the coil spring substantially in a straight downward fashion. This movement brings the movable contact plate into contact with the stationary contact plate. Through this manner of operation, the operating load or the force of depression is substantially equal to the resiliency of the coil spring.

On the other hand, Japanese Patent Application Publication (OPI) No. 42112/1983 discloses a horn switch in which the horn bottom is tilted like a lever, such that the horn button can be operated with a force that is smaller than the resiliency of the coil spring. However, it should be noted that, with the horn switch disclosed there, the horn button must be depressed by being tilted; that is, it cannot be operated by being depressed in a substantially downward direction.

SUMMARY OF THE INVENTION

In view of the foregoing, an object of the present invention is to provide a horn switch in which the horn button can be operated by a substantially downward depression, and, depending on the depressing point, it can also be operated by being tilted such that the force necessary to activate the horn is reduced.

The foregoing object and other objects of the present invention have been achieved by the present invention by providing a steering wheel mountable horn switch which comprises a stationary contact plate with a movable contact plate provided above that stationary contact plate. A coil spring is interposed between the two plates such that the movable contact plate is urged away from the stationary contact plate, with an insulting plate abutting against the coil spring at one end. The horn button itself abuts against the upper surface of the movable contact plate. According to the invention, the movable contact plate, the coil spring, the insulating spacer and the stationary contact plate all have a through-hole through which a stem mounted to the bottom of the horn button passes. This stem is secured under the stationary contact plate by a plate-shaped member. The horn button has an abutting member mounted to its underside which member is in contact with the movable contact plate.

In operating the horn switch of the present invention, when the operator depresses the horn button in a substantially downward fashion (at the center), the movable contact plate is brought into contact with the stationary contact plate against the resilient force of the coil spring. That is, the horn is positively operated by the straight depression of the horn button.

On the other hand, when the operator depresses the horn button at the edge portion of that button must be removed from the free end of the plate-shaped member secured to the stem of the horn button, with the free end of the plate-shaped member acting as a fulcrum, and the movable contact plate is brought into contact with the stationary contact plate. Because the tilting of the horn button decreases the button operating load to a fraction of the resilient force of the coil spring, the force require for operating the horn button in this fashion is correspondingly reduced.

As was described above, the horn switch of the invention is capable of being operated not only by a substantially downward depression of the horn button, but also by a tilting at the edge portion which is removed from the free end of the plate-shaped member secured to the stem of the horn button on the underside of the stationary contact plate. In the latter case, the operating load is reduced. The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a sectional view for a description of the operation of the horn switch according to the invention.

FIG. 5 is a view as seen in X-direction of FIG. 1.

DETAILED DESCRIPTION OF THE INVENTION

Figure 1:
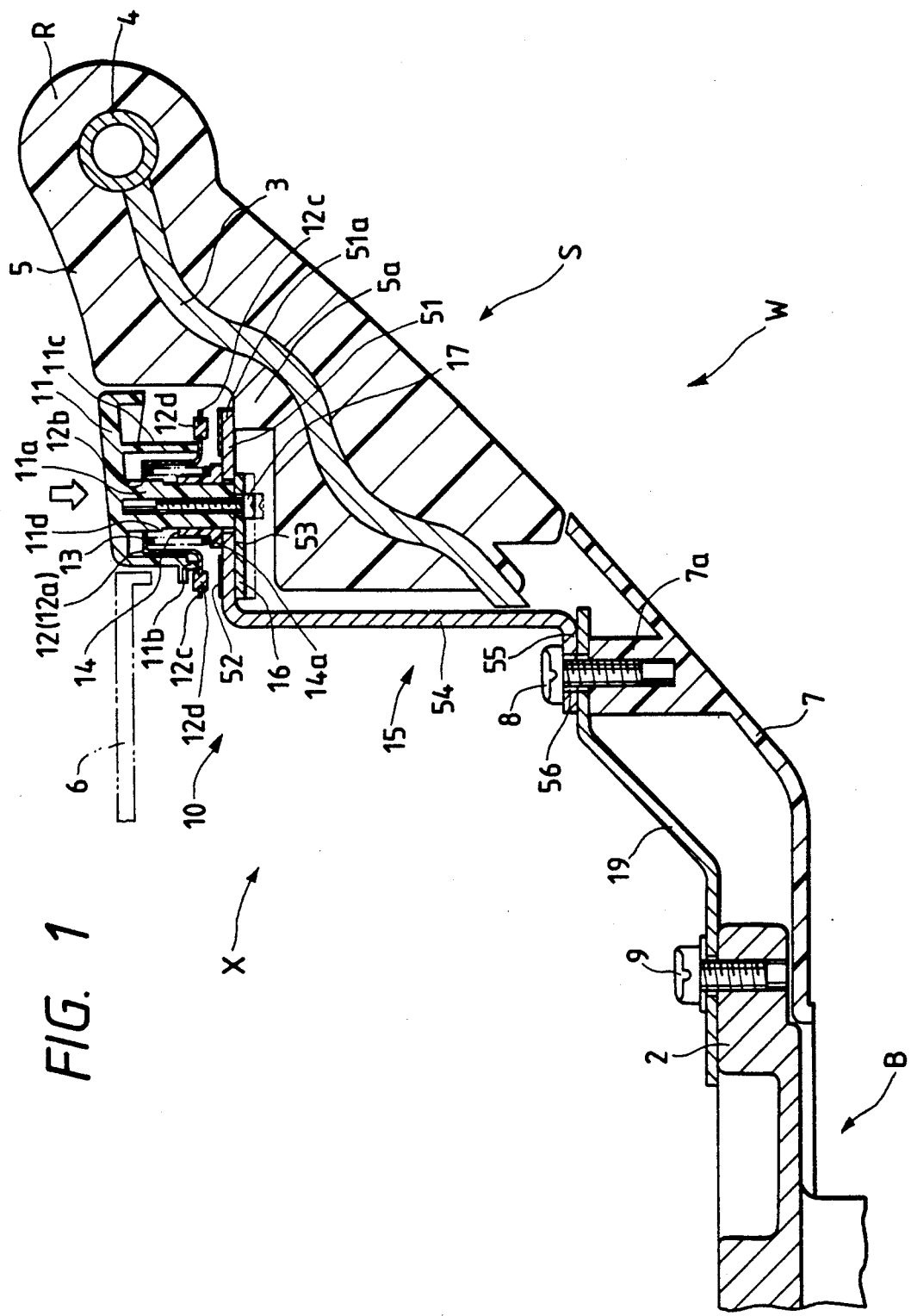
FIG. 1 is a sectional view of a steering wheel taken along line I—I in FIG. 3, showing one example of a horn switch according to this invention.

One preferred embodiment of this invention will be described with reference to the accompanying drawings.

As shown in FIGS. 1 through 5, right and left horn switches 10 according to the invention are mounted on two front spoke members at the four spoke steering wheel W. In the steering wheel, the boss 1 of a boss member B is coupled to the cores 3 of the spoke members S through a boss plate 2 of die cast metal, and the core 4 of a ring member R and the portions of the spoke member cores 3 which are closer to the ring member R are covered with a synthetic resin layer 5. In the boss member B, a shock absorber (not shown) is disposed between the boss 1 and a pad 6.

Figure 2:
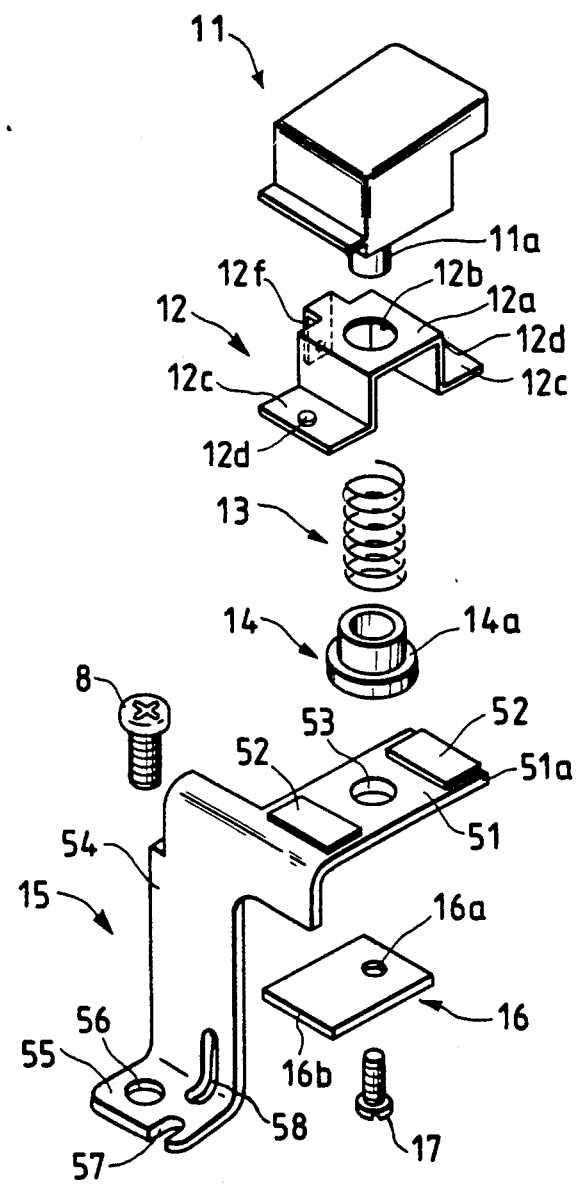
FIG. 2 is an exploded perspective view showing the horn switching according to the invention.
Figure 2:
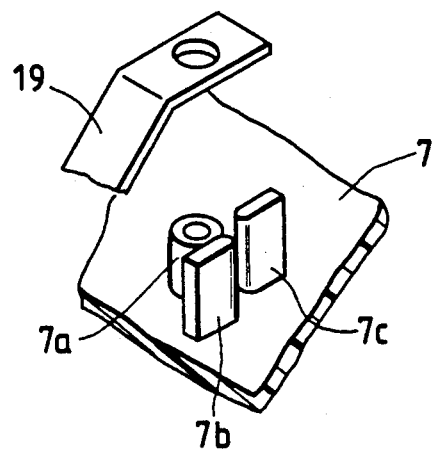

As is shown most clearly in FIG. 2 each of the right and left horn switches 10 comprises a horn button 11, a movable contact plate 12, a coil spring 13, an insulating spacer 14, a stationary contact plate 15, and a plate-shaped member 16. Only the right horn switch is shown; however, it should be noted that the components of the left horn switch (not shown) are symmetrical in configuration with those of the right horn switch.

The horn button 11 is made of a hard synthetic resin (such as ABS), and as illustrated in FIGS. 1 and 4; the horn button 11 has a cylindrical stem 11a extended from the lower surface at the center, and two ribs 11b and 11c on both sides of the stem 11a. The ribs 11b and 11c are contact parts which are adapted to abut against the upper surface of the movable contact plate 12.

The movable contact plate 12 is made of a metal, and the mevable contact plate 12 is bent such that it has a horizontal middle part 12a, and right and left bent parts 12c, which parts extend vertically downward from both ends of the horizontal middle part 12a, and are then bent again so as to be L-shaped. The lower horizontal right and left bent parts 12c have contacts 12d. The middle part 12a has a through-hole 12b at the center into which the stem 11a of the horn button 11 is inserted. A tongue piece 12f extends vertically downward from the rear edge of the horizontal middle part 12 as shown in FIG. 2. The tongue piece 12f is connected to a lead wire (not shown) which is connected to the positive side of a horn operating circuit. The ribs 11b and 11c of the horn button 11 are brought into contact with the inner portions of the bent parts 12c of the movable contact plate 12.

The coil spring 13 is an ordinary metal coil spring, and its inside diameter is large enough to receive the stem 11a of the horn button 11.

The insulating spacer 14 is made of a hard synthetic resin such as ABS, and it is substantially in the form of a cylinder with a flange 14a at the bottom. The outside diameter of the cylinder is determined such that the spacer 14 can be inserted into the coil spring 13, and the inside diameter is so determined that the stem 11a of the horn button 11 can be inserted into it. And the outside diameter of the flange 14a is large enough to support the lower end of the coil spring 13.

The stationary contact plate 15 is a preshaped member which may be broken down into its various parts, and the stationary contact plate 15 is made of metal. More specifically, it includes an upper horizontal part 51, a vertical part 54, which extends downward from one end of the upper horizontal part 51, and a lower horizontal part 55, which extends horizontally from the end of the vertical part 54. The stationary contact plate 15 also serves an additional role as a mounting part to mount the horn switch 10 on the spoke member S of the steering wheel W. The upper horizontal part 51 has a through-hole 53 at the center into which the stem 11a of the horn button is inserted. When the horn button 11 is depressed, the two contacts 52, one on either side of the through-hole 53, move into engagement with the contacts 12d of the movable contact plate 12.

Figure 3:
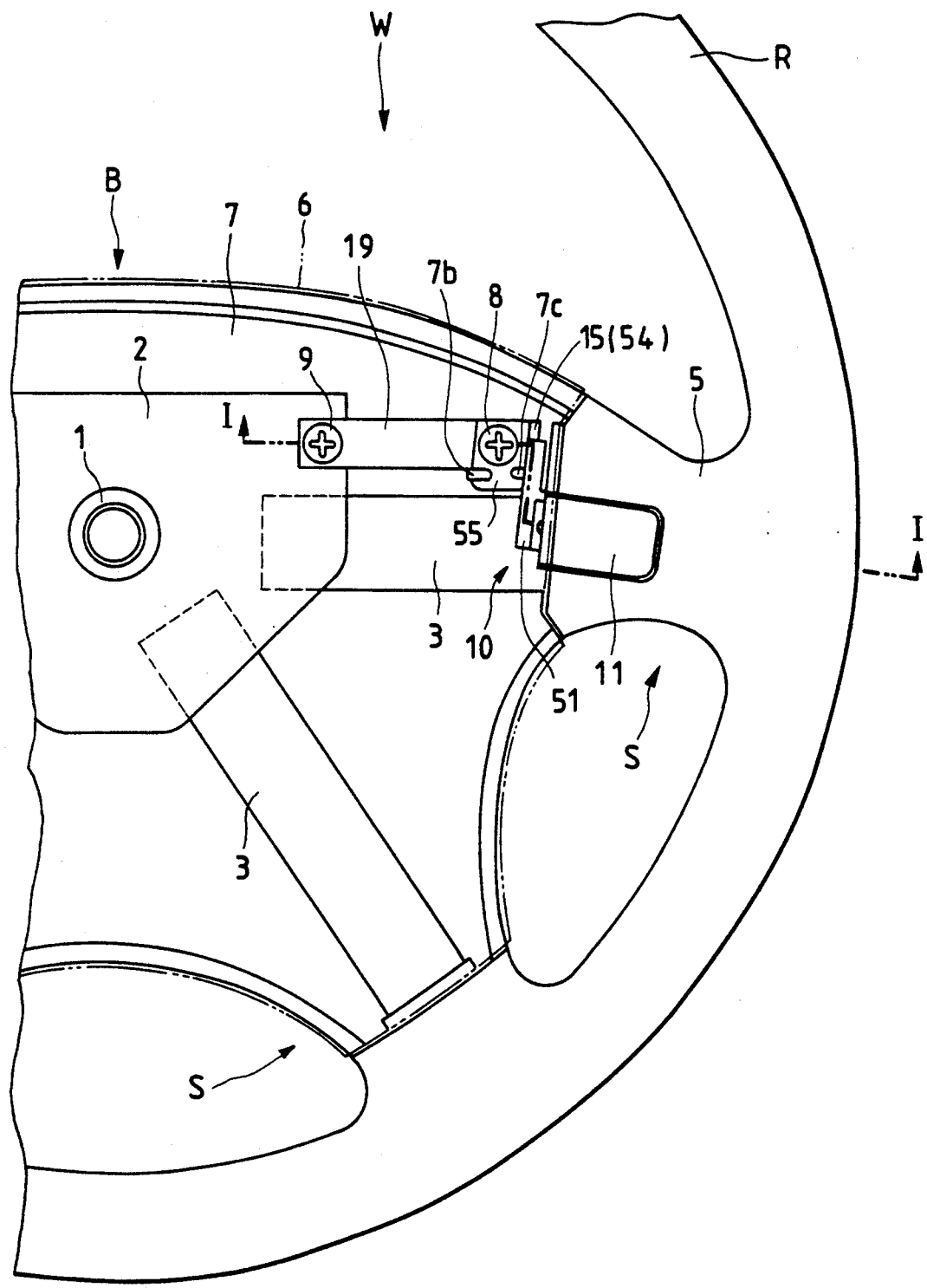
FIG. 3 is a plan view showing a part of the steering wheel with the horn switch.

The lower horizontal part 55 has a through-hole 56 for receiving a screw 8 (as described later), and two positioning holes 57 and 58. The positioning hole 58 is extended into the vertical part 54 of stationary contact plate 15. The through-hole 56 is used to secure the lower horizontal part 55 to a mounting cylinder 7a of the lower cover 7 of the steering wheel W with a screw 8. More specifically, the screw is inserted into the through-hole 56 and threadably engaged with the mounting cylinder 7a of the lower cover 7 so that the lower horizontal part 55 is secured to it while the horn switch 10 is mounted on the spoke member S of the steering wheel W. When the horn switch 10 is mounted on the spoke member S in the above-described manner, the end portion 51a of the upper horizontal part 51 abuts against the step 5a of the cover layer 5 of the spoke member S, such that the upper horizontal part 51 is securely mounted (as shown in FIG. 3). Before the lower horizontal part 55 is secured to the mounting cylinder 7a of the lower cover 7 with the screw 8, a connecting plate 19 is secured to the boss plate 2 of the steering wheel W; that is, the lower horizontal part 55 is secured through the connecting plate 19 to the mounting cylinder 7a with the screw 8. The connecting plate 19 is used to electrically connect the stationary contact plate 15 to the boss plate 2 which is connected to the negative side of the horn operating circuit. The lower cover 7 is fixedly secured to the boss plate 2 with screws.

The positioning holes 57 and 58 of the lower horizontal part 55 are used as follows: In mounting the lower horizontal part 55 on the mounting cylinder 7a of the lower cover 7, the positioning holes 57 and 58 are engaged with positioning protrusions 7b and 7c of the lower cover 7 so that the lower horizontal part 55 can be positioned in place with ease. The plate-shaped member 16 is a rectangular plate having a through-hole 16a in one end portion into which a screw 17 is inserted as described later. The screw 17 is inserted into the through-hole 16a of the plate-shaped member 16, and engaged with the stem 11a of the horn button 11, which stem 11a protrudes downward through the through-hole 53 of the upper horizontal part 51 of the stationary contact plate 15. When the plate-shaped member 16 is secured to the stem 11a of the horn button 11, with the screw 17, the plate-shaped member 16 abuts against the lower surface of the upper horizontal part 51 around the through-hole 53, thus preventing the stem 11a of the horn button 11 from coming off the upper horizontal part 51. In engaging the screw 17 with the stem 11a of the horn button 11, the other end portion 16b of the plate-shaped member 16, which is opposite to the end portion having the through-hole 16a, is confronted with the vertical part 54 of the stationary contact plate 15.

The horn switch 10 is assembled as follows: First, the insulating spacer 14 is disposed on the upper surface of the upper horizontal part 51 of the stationary contact plate 15 in such a manner that it surrounds the through-hole 53, and then the coil spring 13 is mounted on the upper surface of the flange 14a of the insulating spacer 14. Under this condition, the middle part 12a of the movable contact plate 12 is mounted on the upper end of the coil spring 13 in such a manner that the upper end of the coil spring 12 surrounds the through-hole 12b formed in the middle part 12a, and the contacts 12d of the movable contact plate 12 confront with the contacts 52 on the upper horizontal part 51 of the stationary contact plate 15.

Thereafter, the ribs 11b and 11c of the horn button 11 abut against the upper surfaces of the bent parts 12c of the movable contact plate 12, and the stem 11a of the horn button 11 is inserted through the through-hole 12a of the movable contact plate 12, the through-holes of the coin spring 13, the insulating spacer 14, and the through-hoe 53 formed in the upper horizontal part 51 of the stationary contact plate 15.

Under this condition, the plate-shaped member 16 is secured to the lower end face of the stem 11a of the horn button 11 with the screw 17 inserted into the through-hole 16a. Thus, the horn switch 10 has been assembled.

Thereafter, the end portion 51a of the upper horizontal part 51 of the stationary contact plate 15 is abutted against the step 5a of the cover layer 5 of the spoke member S. The connecting plate 19 secured to the boss plate 2 with the screw 9 is interposed between the lower horizontal part 55 and the mounting cylinder 7a of the lower cover 7, and the positioning holes 57 and 58 are engaged with the positioning protrusions 7b and 7c of the lower cover 7, respectively, such that the lower horizontal part 55 of the stationary contact plate 15 is positioned in place on the lower cover 7. The lower horizontal part 55 thus positioned is secured to the mounting cylinder 7a of the lower cover 7 with the screw 8 inserted into the through-hole 56. Thus, the horn switch 10 has been mounted on the spoke member S of the steering wheel W.

The horn is operated as follows: The operator (driver) depresses the horn button 11 at the center straightly, so that the movable contact plate 12 is moved in a substantially downward direction against the resilient force of the coil spring 13 by the ribs 11b and 11c of the horn button 11. As a result, the contacts 12d of the movable contact plate 12 are brought into contact with the contacts 52 of the stationary contact plate 15. Thus, the straight depression of the horn button 11 can positively operate the horn.

The operator may depress the horn button 11 at its edge portion remote from the free end 16b of the plate-shaped member 16 as is depicted in FIG. 4. In this operation, the horn button 11 is tilted like a lever with the free end 16b of the plate-shaped member 16 as a fulcrum. As a result, being pushed by the rib 11c of the horn button 11, the movable contact plate 12 is also tilted against the resilient force of the coil spring 13, such that the right contact 12d (in FIG. 4) is brought into contact with the contact 52 on the stationary contact plate 15. That is, in this case, the horn button 11 is tilted like the lever in which the fulcrum is at O, the point of force is at P, and the point of load is at C. Hence, the operating load can be reduced to $l_2/l_1$ of the resiliency of the coil spring 13 (about 4/7 in the embodiment).

In the above-described embodiment, the insulating spacer 14 abuts against (supports) the lower end of the coil spring 13; however, an insulating spacer abutting against the upper end of the coil may be used if it can insulate the movable contact plate 12 and the stationary contact plate 15 from each other.

Furthermore, in the above-described embodiment, the two ribs 11b and 11c, extended downwardly from the horn button body are in contact with the movable contact plate 12. As an alternative, the stem 11a of the horn button 11 may be designed such that it has a shoulder 11d as shown in FIG. 1, which shoulder can abut against the periphery of the through-hole 12b of the movable contact plate 12.

Moreover, in the above-described embodiment, the lower horizontal part 55 of the stationary contact plate 15 is fixedly secured to the lower cover 7 of the steering wheel W. However, the lower horizontal part 55 may be so modified that it can be connected directly to the boss plate 2. Alternatively, the stationary contact plate may be so modified that, with the vertical part 54 and the lower horizontal part 55 eliminated therefrom, it is secured directly to a mounting seat or the like provided on the spoke core 3.

While the invention has been described in connection with the preferred embodiment of the invention, it will be obvious to those skilled in the art that various changes and modifications may be made therein without departing from the invention, and it is to be understood that the invention is not to be limited to the disclosed embodiment, but on the contrary, is intend to cover various modification and equivalent arrangements included within the spirit and scope of the appended claims.

What is claimed is:

1. A steering wheel mountable horn switch comprising:
    a stationary contact plate having an upper-side and a lower-side, said stationary contact plate including means defining a through-hole;
    a movable contact plate having an upper-side and a lower-side positioned above said stationary contact plate upper-side, said movable contact plate including means defining a through-hole;
    means for urging said movable contact plate away from said stationary contact plate;
    means for electrically insulating said movable contact plate from accidental electrical contact with said upper-side of said stationary contact plate;
    a horn button having an under-side and a upper-side, and including an abutting member mounted on said under-side, said abutting member being positioned as so to be in contact with said movable contact plate, said horn button further including a stem mounted to said under-side of said horn button, said stem being positioned so as to extend through said through-holes defined in each of said contact plates; and
    a plate-shaped member fixedly mounted at one end thereof to said horn button stem, said plate-shaped member being positioned so as to abut said stationary contact plate under-side in close proximity to said through-hole of said stationary contact plate.

2. A steering wheel mountable horn switch according to claim 1, wherein said means for urging said two contact plates apart comprises a coil spring interposed between said stationary contact plate and said movable contact plate.

3. A steering wheel mountable horn switch according to claim 2, wherein said means for insulating said two plates from accidental electrical contact comprises an insulating plate with two horizontal sides, positioned such that one horizontal side abuts said stationary plate upper side and said other horizontal side abuts said coil spring, said insulating plate further including means defining a through-hole for passage of said horn button stem.

4. A steering wheel mountable horn switch according to claim 1, wherein said movable contact plate is bent such that it includes a horizontal middle part and right and left parts bent so as to extend vertically downward from both ends of said middle horizontal part, said right and left parts further being bent so as to each include horizontally extending lower parts, said right and left bent parts further include electrical contacts positioned on said lower horizontal parts.

5. A steering wheel mountable horn switch according to claim 4, wherein said stationary contact plate is bent such that it includes an upper horizontal part, a vertical part extending downward from one end of the upper horizontal part, and a lower horizontal part extending horizontally from said vertical part.

6. A steering wheel mountable horn switch according to claim 5, wherein said upper horizontal part includes two electrical contacts, one on either side of said through-hole, said contacts being positioned so as to be selectively engageable with said electrical contacts on said movable contact plate.

7. A steering wheel mountable horn switch according to claim 5, wherein said lower horizontal part includes means defining a through-hole for receiving a mounting screw for fixedly mounting the stationary contact plate to a steering wheel, and further including means defining through-holes for adjustably positioning the horn switch on a steering wheel.

8. A horn switch mounting structure for mounting a horn switch mechanism on a spoke member of a steering wheel body, comprising:

a support member including an upper horizontal part on which said horn switch is mounted, said upper horizontal part having an upper-side and a lower-side and including means defining a through hole, said support member further including a vertical part extending downwardly from one end of said upper horizontal and a lower horizontal part extending from a lower end of said vertical part, said lower horizontal part including means defining both a mounting hole and a plurality of positioning holes;

a steering wheel body including positioning protrusions capable of engagement with said positioning holes, and further including a fixing member which conforms to said mounting hole means; and a cover layer covering the core of said spoke, said cover layer being positioned beside said horn switch mechanism;

said horn switch mechanism comprising:

a movable contact plate having an upper-side and a lower-side positioned above said horizontal part of said support member upper-side, said movable contact plate including means defining a through-hole;

means for urging said movable contact plate away from said horizontal upper part;

means for electrically insulating said movable contact plate from accidental electrical contact with said upper-side of said horizontal upper part;

a horn button having an upper-side and a upper-side, and including an abutting member mounted on said under-side, said abutting member being positioned as so to be in contact with said movable contact plate, said horn button further including a stem mounted to said under-side of said horn button, said stem being positioned so as to extend through said through-holes defining in each of said movable contact plate and said upper horizontal part; and a plate-shaped member fixedly mounted at one end thereof to said horn button stem, said plate-shaped member being positioned so as to abut said upper horizontal part under-side in close proximity to said through-hole of said upper horizontal part.

* * * * *